(12) United States Patent
Taguchi

(10) Patent No.: US 6,889,617 B2
(45) Date of Patent: May 10, 2005

(54) COLLISION ENERGY ABSORBING STRUCTURE OF VEHICLE

(75) Inventor: Makoto Taguchi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 160 days.

(21) Appl. No.: 10/116,604

(22) Filed: Apr. 4, 2002

(65) Prior Publication Data

US 2002/0153719 A1 Oct. 24, 2002

(30) Foreign Application Priority Data

Apr. 20, 2001 (JP) ........................................ 2001-122028

(51) Int. Cl.[7] .............................................. B61D 15/06
(52) U.S. Cl. ...................... 105/392.5; 296/205; 280/105
(58) Field of Search ................................. 296/205, 189, 296/188, 203.2; 52/735.1, 731; 280/784, 789, 106 R; 293/109, 21, 125, 20, 102, 122, 63; 188/377; 105/392.5, 393, 456, 396; 213/220, 1 A

(56) References Cited

U.S. PATENT DOCUMENTS

| | | | |
|---|---|---|---|
| 3,888,502 A | * 6/1975 | Felzer et al. ................. | 280/784 |
| 4,715,292 A | * 12/1987 | Pavlick et al. ............... | 105/456 |
| 5,080,410 A | * 1/1992 | Stewart et al. ............... | 293/102 |
| 5,431,445 A | 7/1995 | Wheatley | |
| 5,579,699 A | 12/1996 | Dannawi et al. | |
| 6,062,634 A | * 5/2000 | Aloe et al. .............. | 296/203.02 |
| 6,167,815 B1 | 1/2001 | Werner et al. | |
| 6,196,135 B1 | * 3/2001 | Kashima et al. .......... | 105/392.5 |

FOREIGN PATENT DOCUMENTS

| | | | | |
|---|---|---|---|---|
| DE | 196 31 901 A1 | 8/1996 | | |
| GB | 2 304 651 A1 | 3/1997 | | |
| GB | 2304651 A | * 3/1997 | ........... | B62D/21/15 |
| JP | 58-116467 | 8/1983 | | |
| JP | 6-63467 | 9/1994 | | |
| JP | 2650527 | 5/1997 | | |
| JP | 2650527 B2 | * 5/1997 | ........... | B62D/21/15 |
| JP | 09-277953 | 10/1997 | | |
| JP | 09-277954 | 10/1997 | | |
| JP | 11-005564 | 1/1999 | | |
| JP | 2882243 | 2/1999 | | |
| JP | 2882243 B2 | * 2/1999 | ........... | B62D/21/15 |

OTHER PUBLICATIONS

European Search Report by The Hauge for EP 02 25 2737 dated Mar. 18, 2003.

* cited by examiner

*Primary Examiner*—Frantz F. Jules
(74) *Attorney, Agent, or Firm*—Marshall, Gerstein & Borun LLP

(57) ABSTRACT

Disclosed is a collision energy absorbing structure of a vehicle capable of relieving impact by using a tubular pipe member having equally-sized rectangular cross section and equal plate thickness and including no inside ribs and by adding a suitable trigger, and being easily manufactured at a low cost. By forming a cutout portion on the left side of the front end portion of the collision energy absorbing structure, the deformation starting portion is provided. The cutout portion is formed at parts of three flat plate portions comprised of one of the four flat plate portions and corresponding opposite portions thereof. The general portion, which follows the deformation starting portion, is tubular with rectangular cross section and has a closed cross-section structure.

1 Claim, 18 Drawing Sheets

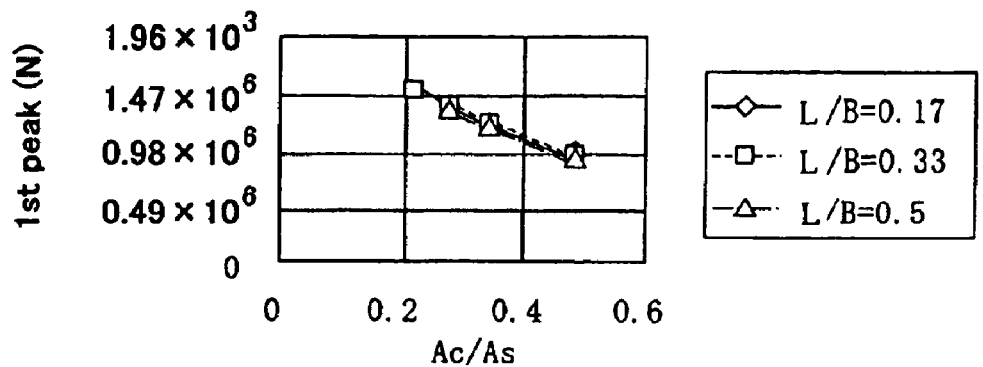
Fig. 1 2 (A)
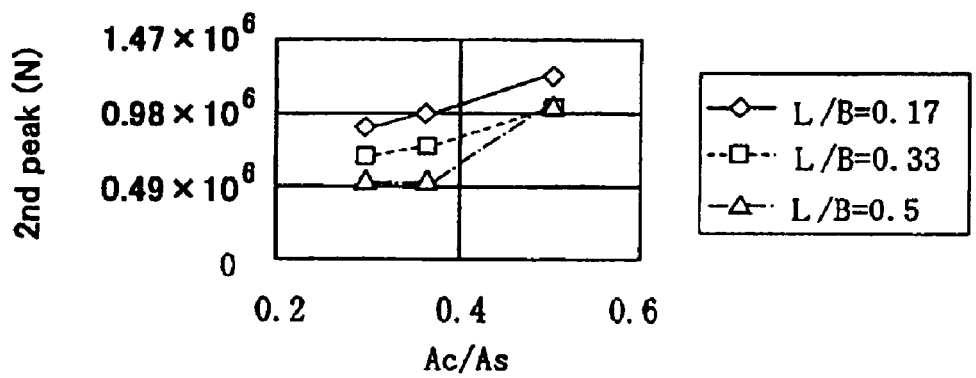
Fig. 1 2 (B)
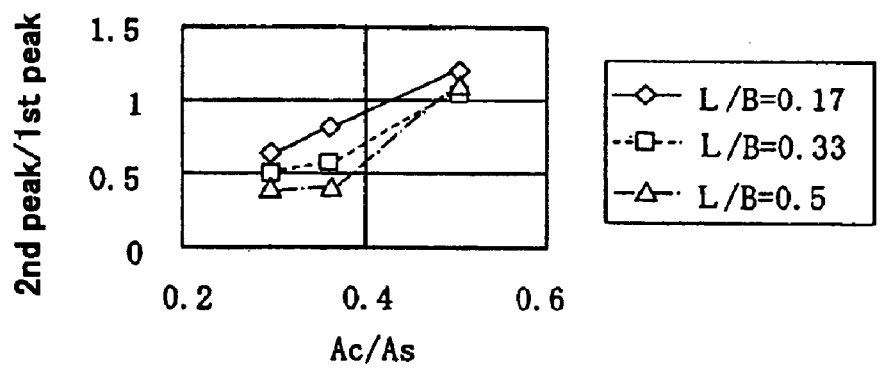
Fig. 1 2 (C)

COLLISION ENERGY ABSORBING STRUCTURE OF VEHICLE

BACKGROUND OF THE INVENTION

1. Field of the Invention

The present invention relates to a collision energy absorbing structure of a vehicle which is used for absorbing a collision energy generated by a collision of vehicles such as railroad vehicles by bellows-like deformation (plastic deformation) of a tubular energy absorbing member with rectangular cross section to relieve impact when collision occurs.

2. Description of the Related Art

In general, it is known that a pipe member can be used as an energy absorbing member for absorbing a collision energy by bellows-like deformation, because the pipe member is plastically deformed like bellows while suppressing deformation of the Euler buckling when a compression force is axially applied to the pipe member by suitably selecting a dimension or a thickness thereof. Since such bellows-like deformation is capable of stably absorbing the collision energy, conventionally, the collision energy absorbing structure using the pipe member has been widely used.

By the way, since a high reaction force is generated in triggering the bellows-like deformation when such pipe member is used to form the collision energy absorbing structure, the impact acting on passengers is increased in an initial stage of collision. Accordingly, the following structure has been proposed as a structure for reducing the maximum force in the initial stage of collision.

(1) By way of example, in a structure disclosed in Japanese Patent No. 2650527 in which ribs are longitudinally formed integrally with the inside of a member body extruded to have closed cross section and provided in the longitudinal direction of the vehicle to define a plurality of parts in the member body, the ribs have inclined portions at end portions thereof which are extending from points connecting the ribs to peripheral portions of the member body toward the inside of the body. In this structure, since the inclined portions are thus formed in the ribs at end face portion of the member body and the corresponding rib cross-sectional areas are extremely small, the member body tends to be axially deformed by buckling upon application of an axial collision force to the end portion of the member body in collision of the vehicle. Consequently, an initial reaction force can be reduced.

(2) As another example, as disclosed in Japanese Patent No. 2882243, a plurality of arc-shaped grooves inwardly recessed and axially extending from the front end are formed circumferentially and at substantially equal intervals at the front end portion of a tubular chassis frame provided in the longitudinal direction of the vehicle. In this structure, upon application of impact to the front end portion from front, the arc-shaped groove portions and the portions without the grooves are continuously and axially deformed by buckling while being deformed alternately and inwardly or outwardly from the front end, so that plastic deformation is stabilized with bellows being close to one other.

(3) As a further example, as disclosed in Publication of Examined Patent Application No. Hei. 11-5564, a side member of a vehicle formed to have a hollow shaft by extruding aluminum is provided with at least one rib in the longitudinal direction thereof and the thickness of the rib and the thickness of the side member are gradually increased from the end portion toward a vehicle chamber side in the longitudinal direction of the vehicle. Because of such a gradual increase in the thickness, this structure is capable of reducing an initial maximum force while keeping a collision energy absorbing ability large as the whole.

(4) As a still further example, as disclosed in Publications of Examined Patent Applications Nos. Hei. 9-277953, 9-277954, in an energy absorbing member capable of absorbing a collision energy by bellows-like bucking deformation, a cross section of a buckling deformation starting end is a polygon-shaped closed cross section with angles more than 4 and a cross section of the other end is a polygon-shaped closed cross section having sides more than those of the cross section of the starting end, between which the cross section gradually varies. These structures enable the increasing of the buckling force and the reducing of the initial impact force by utilizing the polygon-shaped cross section or a tapered shape with varying cross section to suppress the initial impact force or stabilize the first buckling deformation.

However, the structures of (1)–(4) suffer from the following drawbacks.

(A) In the structure disclosed in Japanese Patent No. 2650527, since the inclined portions are formed at the ribs inside of the member body, its structure is complicated. In addition, this structure is only applicable to the structure having inside ribs (e.g., extruded aluminum).

(B) The structure disclosed in Japanese Patent No. 2882243 is applicable only to the cylindrical frame. Since the bellows-like deformation tends to be unstable in the cylindrical frame as compared to the tubular frame with rectangular cross section, a stable energy absorbing characteristic is difficult to obtain.

(C) In the structures disclosed in Publications of Examined Patent Applications Nos. Hei. 11-5564, 9-277953, 9-277954, since the pipe member (side member or energy absorbing member) has a structure with the cross section varying in the axial direction thereof, a special and complicated process is needed.

SUMMARY OF THE INVENTION

The present invention addresses the above-described condition, and an object of the present invention is to provide a collision energy absorbing structure of a vehicle capable of absorbing impact by using a tubular pipe member having an equally-sized rectangular cross section and an equal plate thickness and including no inside ribs and by adding a suitable trigger, and being easily manufactured at a low cost.

To achieve the above object, according to the present invention, there is provided a collision energy absorbing structure of a vehicle comprising: a tubular energy absorbing member with rectangular cross section, provided in the longitudinal direction of the vehicle and having four flat plate portions, the tubular energy absorbing member being adapted to receive a collision force in the longitudinal direction of the vehicle and deformed like bellows by buckling, so as to absorb a collision energy; and a deformation starting portion provided by forming a cutout portion in one of right and left sides or one of upper and lower sides of a front end portion of the energy absorbing member.

According to the present invention, the strength of the deformation staring portion is lower than the strength of the other part of the energy absorbing member and the initial impact force can be reduced. In addition, since the deformation starting portion is provided by reducing the size of part of the tubular energy absorbing member with rectangular cross section, the structure can be simplified.

In the collision energy absorbing structure, the deformation starting portion may be provided by forming a cutout portion in one end of right and left sides or one of upper and lower sides of a front end portion of the energy absorbing member. Also, the cutout portion may be formed in parts of three flat plate portions comprised of one of the four flat plate portions and flat plate portions located on both sides thereof. By increasing/reducing the number of the energy absorbing members, the amount of absorbed energy can be adjusted in the whole structure. The tubular member needs to have four flat plate portions and may have square or rectangular cross section. The energy absorbing member may be manufactured by forming the cutout portion at the front end portion of the tubular member with rectangular cross section (closed cross section structure), or otherwise, by opposing open sides of two channel members having different lengths because of the cutout portion to each other and bonding flanges thereof together.

The tubular energy absorbing member may have a portion extended from part of the front end portion so as to be substantially channel shaped. The provision of the cutout portion at the front end portion of the energy absorbing member is equivalent to the provision of the extended portion at the front end portion.

In this constitution, upon application of the force in the longitudinal direction of the vehicle when collision occurs, since the front end portion is provided with the cutout portion and has the open cross section, i.e., provided with the extended portion, the initial force peak for generating the bellows-like deformation can be reduced as compared to the case where the tubular portion (closed cross section structure) is deformed like bellows without the cutout portion.

Since the front end portion (extended portion) has already started to be deformed, the following tubular portion starts to be deformed like bellows naturally. More specifically, the deformation sequentially occurs in the front end portion (extended portion) and the portion continuous with the front end portion, while the portion provided with the cutout portion starts to be newly deformed like bellows after the bellows-like deformation of the front end portion, so that the force peak for generating the new bellows-like deformation is reduced and the bellows-like deformation naturally takes place. Consequently, the collision energy can be efficiently absorbed.

Further, since the tubular pipe with rectangular cross section is provided with the cutout portion, that is, the channel-shaped extended portion, the energy absorbing member can be manufactured easily and at a low cost. In particular, since the front end portion is provided with the cutout portion, i.e., the extended portion so as to be vertically or laterally asymmetric, the reaction force in the initial stage of collision can be reduced with such simple structure. Also, since the bellows-like deformation has already started in part (asymmetric portion) of the front end portion, the reaction force at the start of deformation of the other portion is reduced to be substantially equal to the reaction force in the initial stage of the collision (see FIG. 2), thereby keeping a constant reaction force. Consequently, the impact acting on the passengers can be relieved without a rapid rise in the impact force.

Also, a plurality of impact absorbing members may be provided so as to be vertically or laterally symmetric.

In this constitution, since the plurality of energy absorbing members are vertically or laterally symmetric, the impact in the traveling direction is evenly applied to the front end portions (extended portions) of these energy absorbing members, so that the bellows-like deformation occurs naturally without falling the energy absorbing members.

The collision energy absorbing structure may further comprise: a rubber damper connected to a coupler of the vehicle, for absorbing and relieving impact generated between vehicles, and a front end portion of the energy absorbing member may be connected to a rear end portion of the rubber damper and a rear end portion of the energy absorbing member may be connected to a draft stop mounted to a vehicle body frame.

With this constitution, the small collision energy can be absorbed by the rubber damper and the great collision energy can be absorbed by bellows-like deformation of the energy absorbing member.

In the collision energy absorbing structure, the energy absorbing member may be provided behind a rail guard board for eliminating obstacles on a rail during traveling and a rear end portion of the energy absorbing member may be connected to a support device mounted to a vehicle body frame.

With this constitution, when the excessive collision energy is applied to the rail guard board for eliminating obstacles on the rail during traveling, this collision energy is absorbed by the bellows-like deformation of the energy absorbing member.

The collision energy absorbing structure, may further comprise: a support device mounted to a vehicle body frame, provided behind a coupler and extending forwardly of a rail guard board, and in this structure, a rear end portion of the energy absorbing member may be connected to a front end portion of the support device, and the energy absorbing member may extend forwardly of the coupler.

In this constitution, since the energy absorbing member extending forwardly of the coupler in the front vehicle is provided with the collision member at the front end thereof, the collision member is collided and the collision energy is absorbed by the bellows-like deformation of the energy absorbing members. Consequently, the impact acting on the passengers can be relieved.

The above and further objects and features of the invention will more fully be apparent from the following detailed description with accompanying drawings.

BRIEF DESCRIPTION OF THE BRIEF DRAWINGS

FIG. 12(A) is a graph showing the relationship between a first peak force generated in an initial stage of collision and a size of a deformation stating portion;

FIG. 12(B) is a graph showing the relationship between a second peak force generated in a middle stage of collision and a size of the deformation staring portion;

FIG. 12(C) is a graph showing the relationship between a ratio between the first peak force and the second peak force and a size of the deformation starting portion;

DETAILED DESCRIPTION OF THE PREFERRED EMBODIMENT

Hereinafter, a preferred embodiment of the present invention will be described with reference to drawings.

Figure 1:
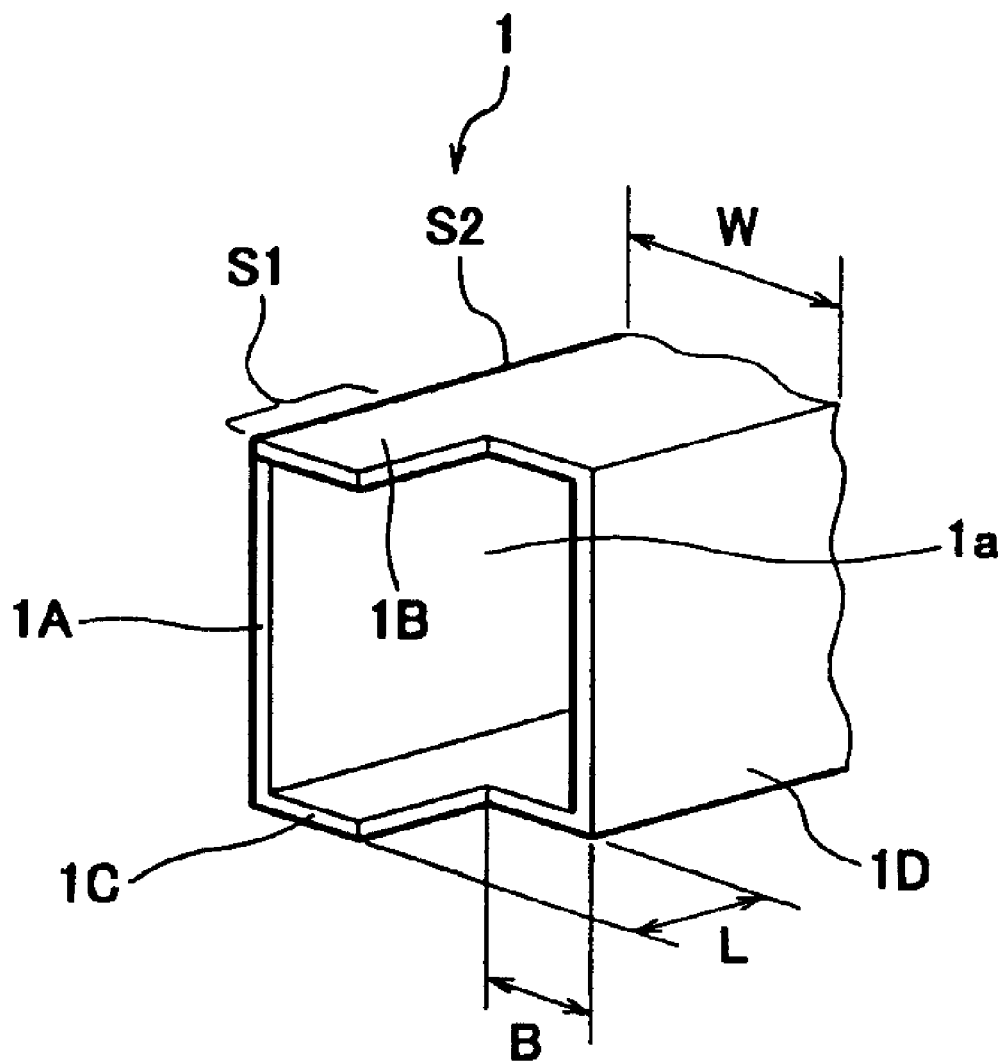
FIG. 1 is a perspective view showing a front end portion of an energy absorbing member used in a collision energy absorbing structure of a vehicle according to the present invention.

FIG. 1 is a perspective view showing an energy absorbing member used in a collision energy absorbing structure of a vehicle according to the present invention.

Referring now to FIG. 1, there is shown a tubular energy absorbing pipe member 1 (energy absorbing member) with rectangular cross section. The energy absorbing pipe member 1 is provided with a cutout portion 1a having an axial dimension L and a width dimension B on the left side of a front end portion S1 which corresponds to a deformation starting portion that has channel-shaped open cross section and is laterally asymmetrical. Here, the width dimension B of the cutout portion 1a is equal to substantially ½ of a width W of the member 1.

The energy absorbing pipe member 1 has a closed cross-section structure having four flat plate portions 1A, 1B, 1C, 1D and the cutout portion 1a is formed by the flat plate portion 1A and parts of the flat plate portions 1B, 1C connected to both sides of the flat plate portion 1A at the front end portion (deformation starting portion) S1. The front end portion S1 provided with the cutout portion 1a functions as a trigger portion for triggering bellows-like deformation for energy absorption and has the channel-shaped open cross section. While corner portions of the cutout portion 1a have certain degrees, for example, 90 degrees in FIG. 1, they may be curved.

In other words, the channel-shaped deformation starting portion (extended portion) S1 is extended from the whole width of the flat plate portion 1A, and part of the flat plate portion 1B and part of the flat plate portion 1C. The extended portion S1 has a length L as shown in FIG. 1.

When the axial force is evenly applied to the front end face of the tubular energy absorbing pipe member 1 with rectangular cross section, deformation (bellows-like deformation) that is laterally asymmetric starts from the deformation starting portion S1 corresponding to the extended portion having low strength. In brief, the deformation starting portion S1 is deformed in the initial stage of collision, which deformation triggers the bellows-like deformation mentioned later.

In the bellows-like deformation (buckling deformation) of the deformation starting portion S1 (trigger portion) in the initial stage of collision, since the deformation starting portion S1 is laterally asymmetrical and has the open cross section because of the cutout portion 1a and initial force necessary for generating the bellows-like deformation as the result of collision is therefore small, the peak of the initial force in the collision is considerably reduced as compared to the case where the tubular pipe member 1 with rectangular cross section is deformed like bellows without the cutout portion 1a.

Then, the bellows-like deformation (buckling deformation) of the deformation starting portion S1 (right-half portion) of the energy absorbing pipe member 1 gradually progresses and reaches a general portion S2 as the closed cross section. Since the asymmetric bellows-like deformation has been already generated, new bellows-like deformation does not occur in the entire general portion S2, but occurs in the left half portion of the general portion S2. So, there is a difference between the time when the initial force (force peak) at the start of the buckling deformation of the deformation starting portion S1 is generated and the time when the initial force at the start of the buckling deformation of the general portion S2 is generated. For this reason, the force necessary for causing the bellows-like deformation in the energy absorbing pipe member 1 is divided into the force at the start of the bellows-like deformation of the deformation starting portion S1 and the force for the start of the bellows-like deformation of the general portion S2. As a result, the peak force in the initial stage of collision is reduced and a constant reaction force is kept. Therefore, the impact acting on the passengers is relieved without a rapid rise in the impact force.

Thus, the bellows-like deformation of the deformation starting portion S1 triggers the bellows-like deformation of the general portion S2. Once the bellows-like deformation occurs in the general portion S2, stable bellows-like deformation continues thereafter. In this case, since the axial (longitudinal) force applied to the energy absorbing pipe member 1 is considerably higher than the force orthogonal to the axial force, transitions of the bellows-like deformation from the deformation starting portion S1 to the general portion S2 smoothly takes place.

Figure 2:
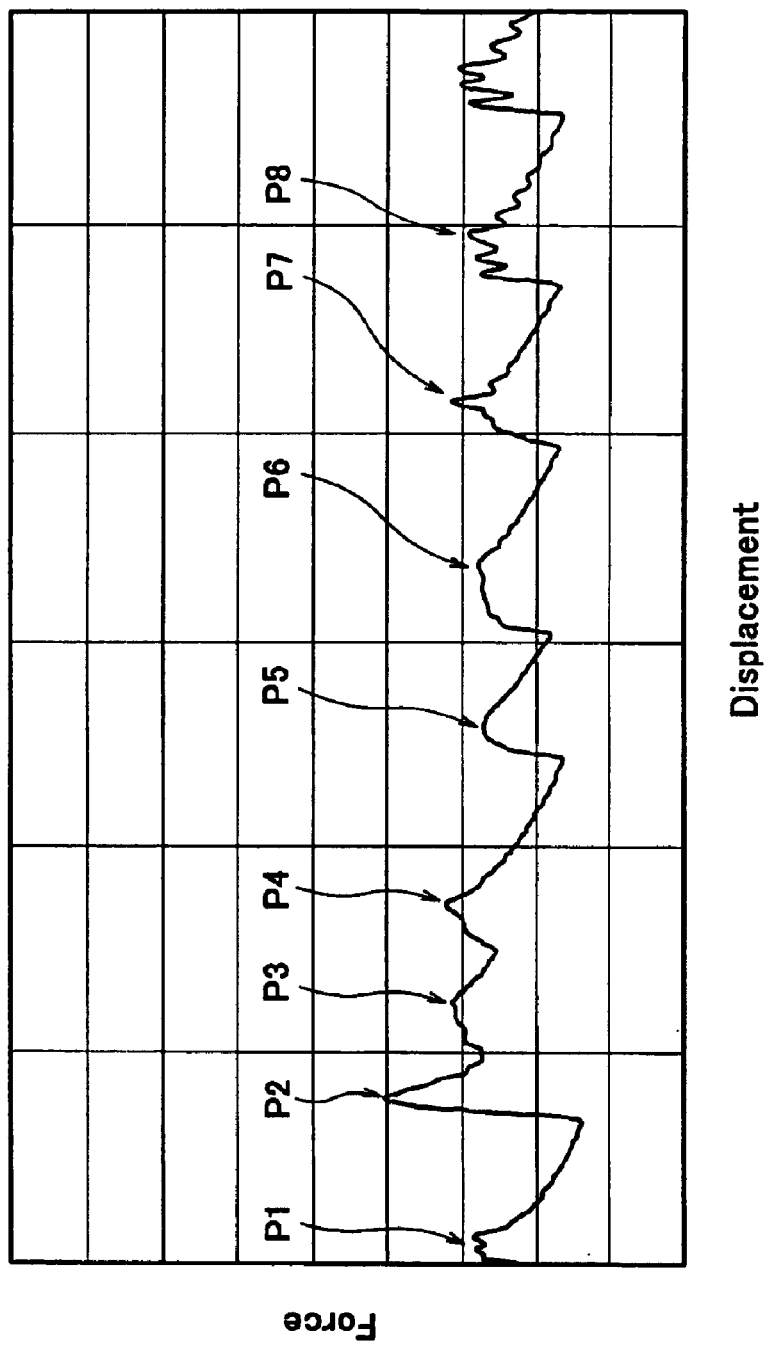
FIG. 2 is a view showing a result of a computer simulation analysis of the relationship between displacement and force applied to the energy absorbing member according to the present invention.
Figure 3:
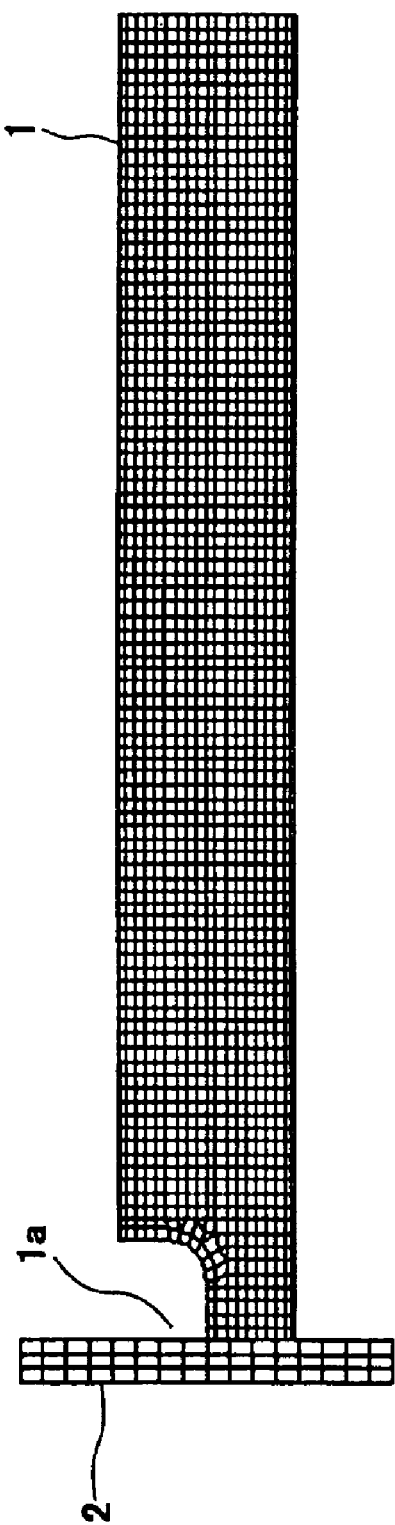
FIG. 3 is an explanatory view schematically showing a first stage of a deformation mode of the front end portion of the energy absorbing member according to the present invention.

FIG. 2 shows a result of computer simulation analysis of the relationship between the force and displacement of this deformation. FIGS. 3 through 11 are views schematically showing change occurring when the collision force is applied to a contact plate 2 provided at the front end of the energy absorbing pipe member 1. In the state of FIG. 3 before collision, no force is applied and the forces in the states of FIGS. 4 through 11 correspond to the forces at force peak points P1–P8 in FIG. 2. As shown in FIGS. 3 through 11, the contact plate 2 is provided on the deformation starting portion S1 of the energy absorbing pipe member 1. In these cases, the cutout portion 1a is formed at the upper half portion of the front end portion (see FIGS. 4 through 11). In other words, the deformation starting portion (extended portion) S1 is extended from the lower half portion of the front end of the energy absorbing pipe member 1.

The state before collision is shown in FIG. 3. Once the collision occurs and the axial collision force (dynamic force) is applied through the contact plate 2, first, the deformation starting portion S1 corresponding to the lower half portion of the energy absorbing pipe member 1 starts to be deformed by buckling. Then, as shown in FIG. 5, the upper flat plate portion of the upper half portion of the closed cross-section structure of the energy absorbing pipe member 1 starts to be deformed by buckling, and then, as shown in FIG. 6, right and left flat plate portions of the closed cross-section structure starts to be deformed by buckling. In this case, a force peak point P1 corresponding to FIG. 4 at which the deformation starting portion S1 starts bellows-like deformation is substantially equal to a force peak point P2 corresponding to FIG. 5 at which the general portion S2 starts bellows-like deformation, although the force peak point P2 is slightly greater than the force peak point P1, thus keeping a constant reaction force.

Once the bellows-like deformation starts, the buckling deformation of the upper and lower flat plate portions (see FIGS. 7, 9, and 11) and the buckling deformation of the right and left flat plate portions (see FIGS. 8, 10) are alternately repeated. Also, in these cases, the constant reaction force can be maintained without significant force fluctuation.

Figure 4:
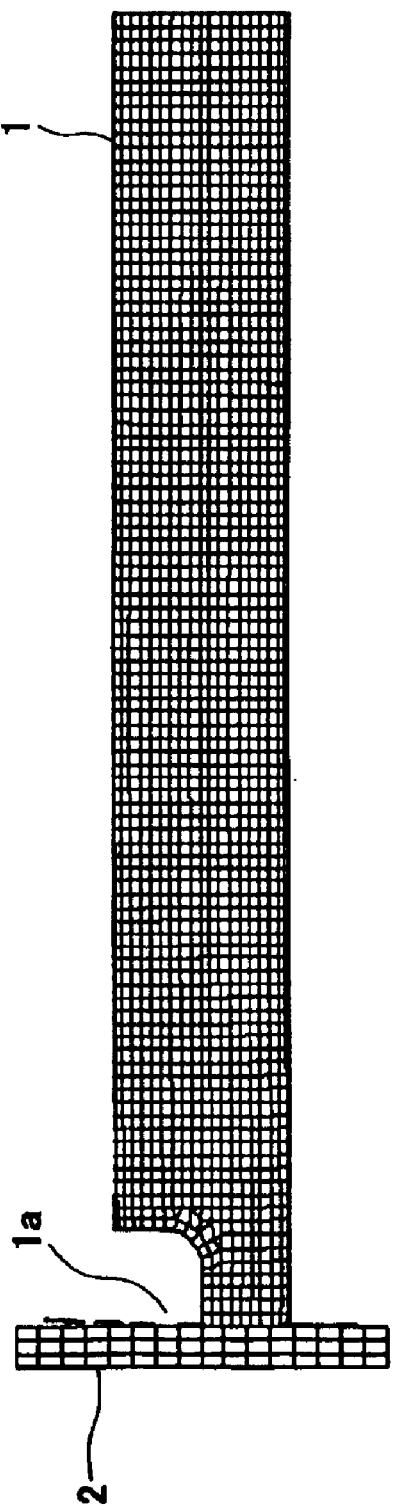
FIG. 4 is an explanatory view schematically showing a second stage of the deformation mode of the front end portion of the energy absorbing member according to the present invention.
Figure 5:
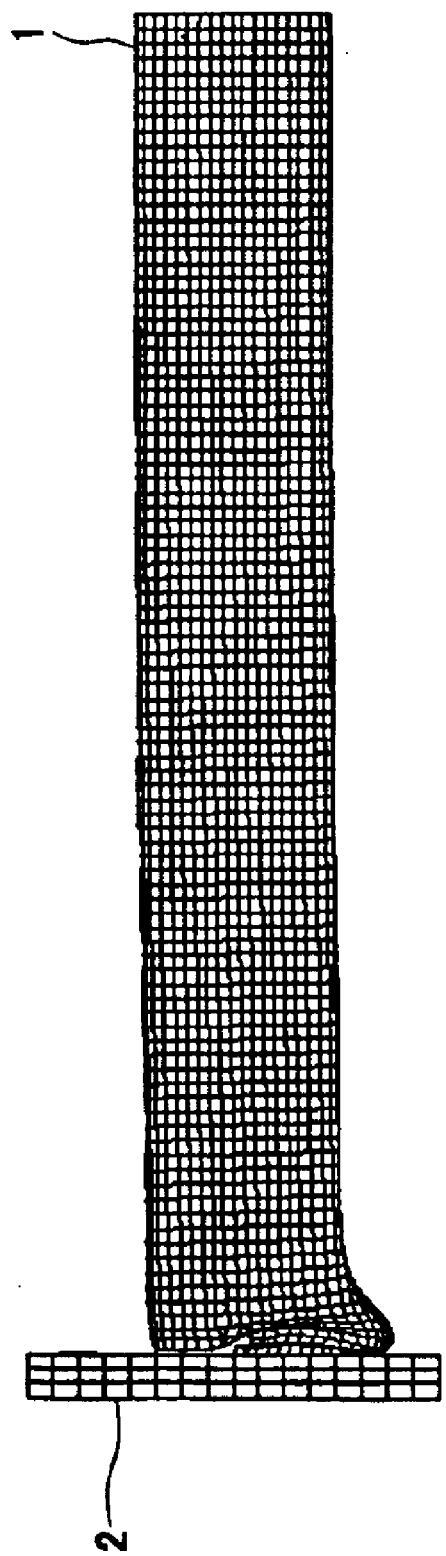
FIG. 5 is an explanatory view schematically showing a third stage of the deformation mode of the front end portion of the energy absorbing member according to the present invention.
Figure 6:
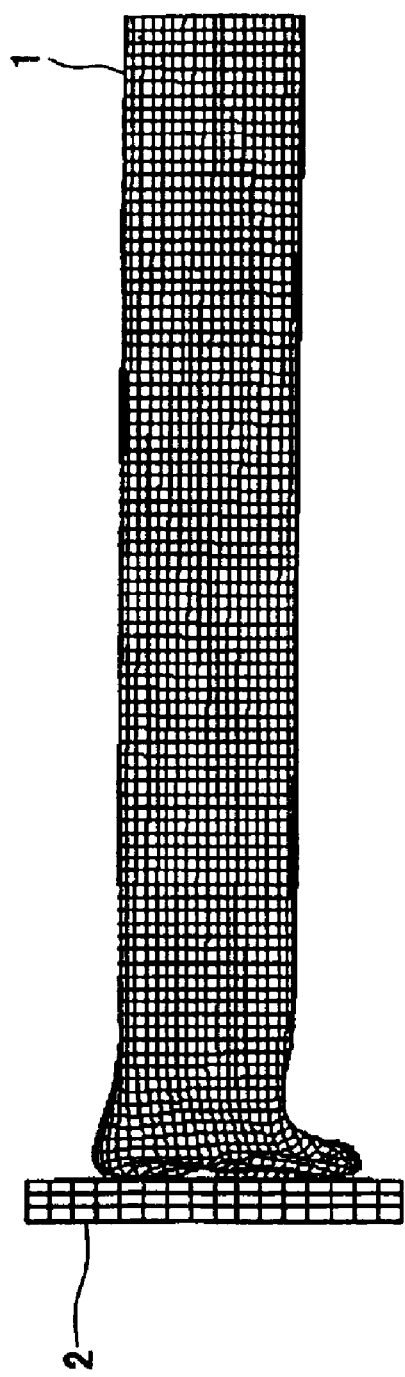
FIG. 6 is an explanatory view schematically showing a fourth stage of the deformation mode of the front end portion of the energy absorbing member according to the present invention.
Figure 7:
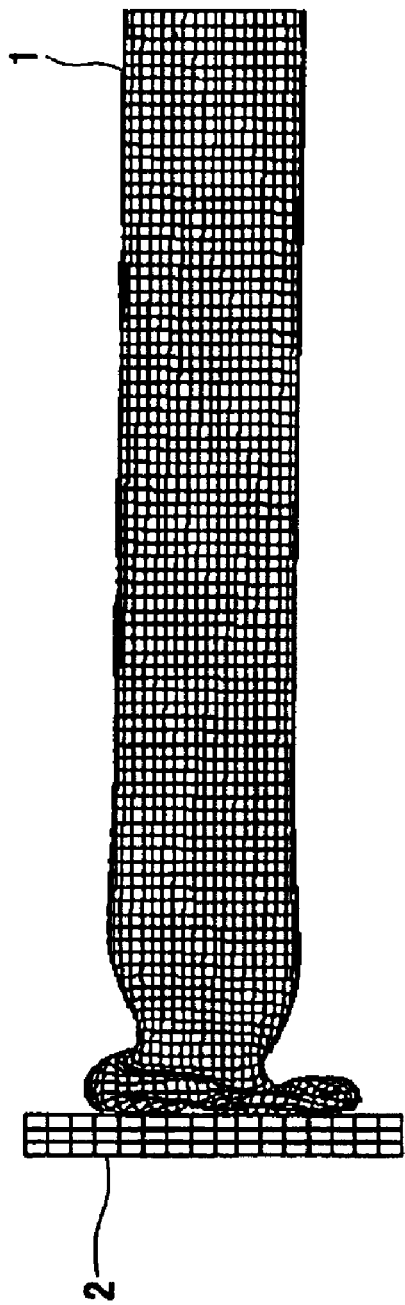
FIG. 7 is an explanatory view schematically showing a fifth stage of the deformation mode of the front end portion of the energy absorbing member according to the present invention.
Figure 8:
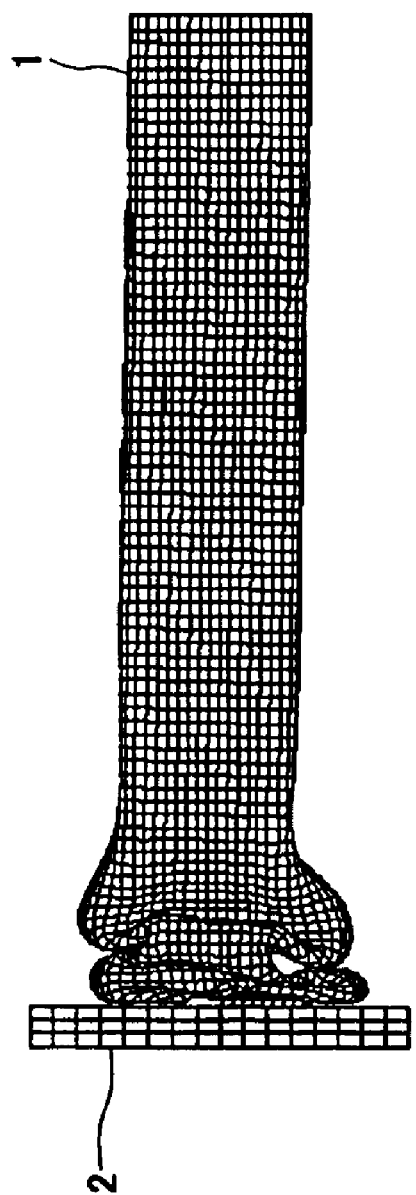
FIG. 8 is an explanatory view schematically showing a sixth stage of the deformation mode of the front end portion of the energy absorbing member according to the present invention.
Figure 9:
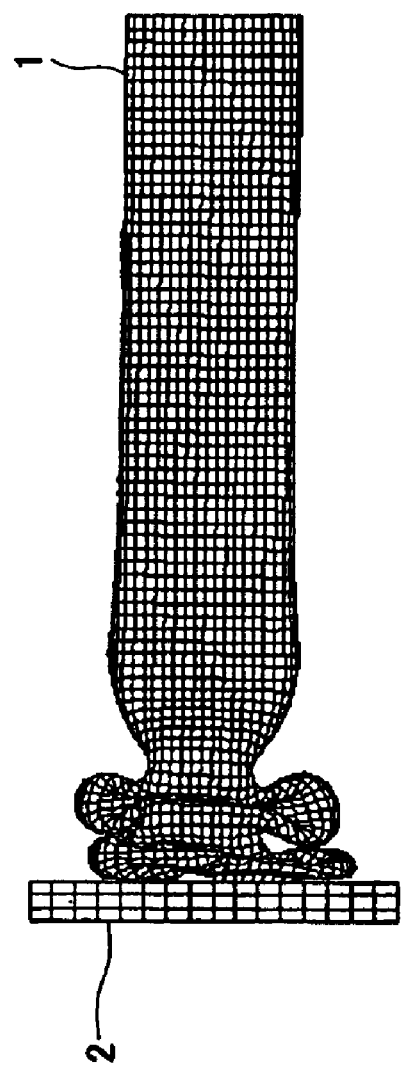
FIG. 9 is an explanatory view schematically showing a seventh stage of the deformation mode of the front end portion of the energy absorbing member according to the present invention.
Figure 10:
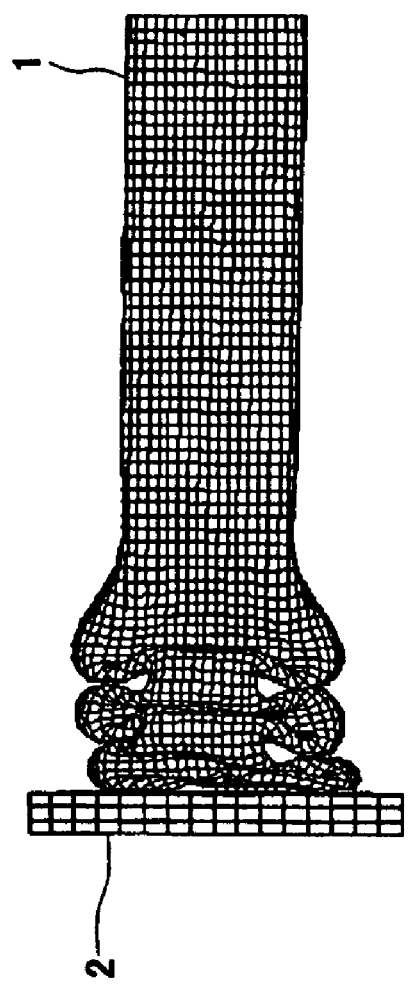
FIG. 10 is an explanatory view schematically showing an eighth stage of the deformation mode of the front end portion of the energy absorbing member according to the present invention.
Figure 11:
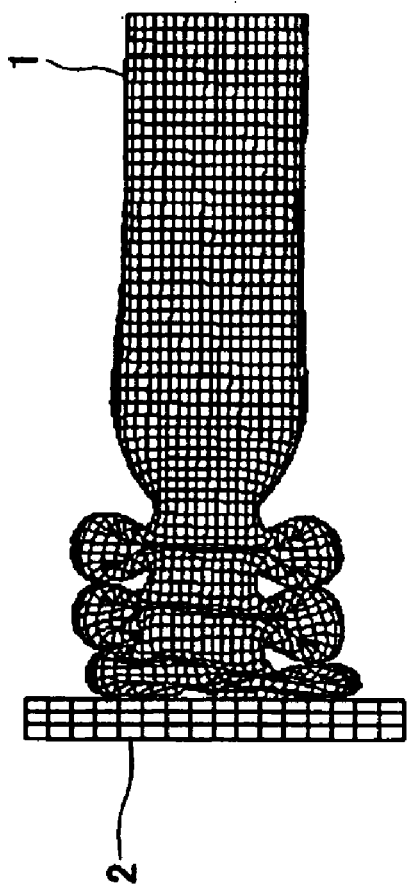
FIG. 11 is an explanatory view schematically showing a ninth stage of the deformation mode of the front end portion of the energy absorbing member according to the present invention.

The reason why the reaction force in the initial stage of the collision decreases as shown in FIG. 2, is that there is a difference between the time when the buckling deformation of the upper flat plate portion starts and the time when the buckling deformation of the lower flat plate portion starts in the states of FIGS. 4, 5, and in the state of FIG. 6 and thereafter, the deformation in its previous stage facilitates the buckling deformation.

Also, the deformation in the initial stage is asymmetric (see FIGS. 4 through 6) and then becomes symmetric. This is because the buckling deformation of the right and left flat plate portions starts from deformation oblique with respect to the axial direction in the state of FIG. 7, and with a progress, this deformation gradually changes into deformation in the direction orthogonal to the axial direction.

Subsequently, simulation analysis results of how the size of the cutout portion 1a affects the initial force will be explained with reference to FIGS. 12(A), (B), (C). In FIGS. 12(A), 12(B), 12(C), B denotes a width of the cutout portion 1a, L denotes an axial length of the cutout portion 1a, and Ac, As respectively denote the cross-sectional area of the deformation starting portion S1 and the cross-sectional area of the general portion S2.

As can be seen from FIG. 12(A), the first peak force generated just after the collision tends to decrease with an increase in the size of the cutout portion 1a i.e., with an increase in Ac/As, whereas, as can be seen from FIG. 12(B), the following second peak force tends to increase with the increase in the cutout portion 1a.

Since it is desirable that there is no great difference between the first and second peak forces and the force fluctuates evenly, judging from FIG. 12(C), the ratio Ac/As between the cross-sectional area of the deformation starting portion S1 and the cross-sectional area of the general portion S2 is preferably approximately 0.5. It is confirmed that the similar tendency and results are obtained in the tubular member with square cross section and the tubular member with rectangular cross section.

EXAMPLE 1

In this example, the energy absorbing member is applied to a coupler of a railroad vehicle.

Figure 13:
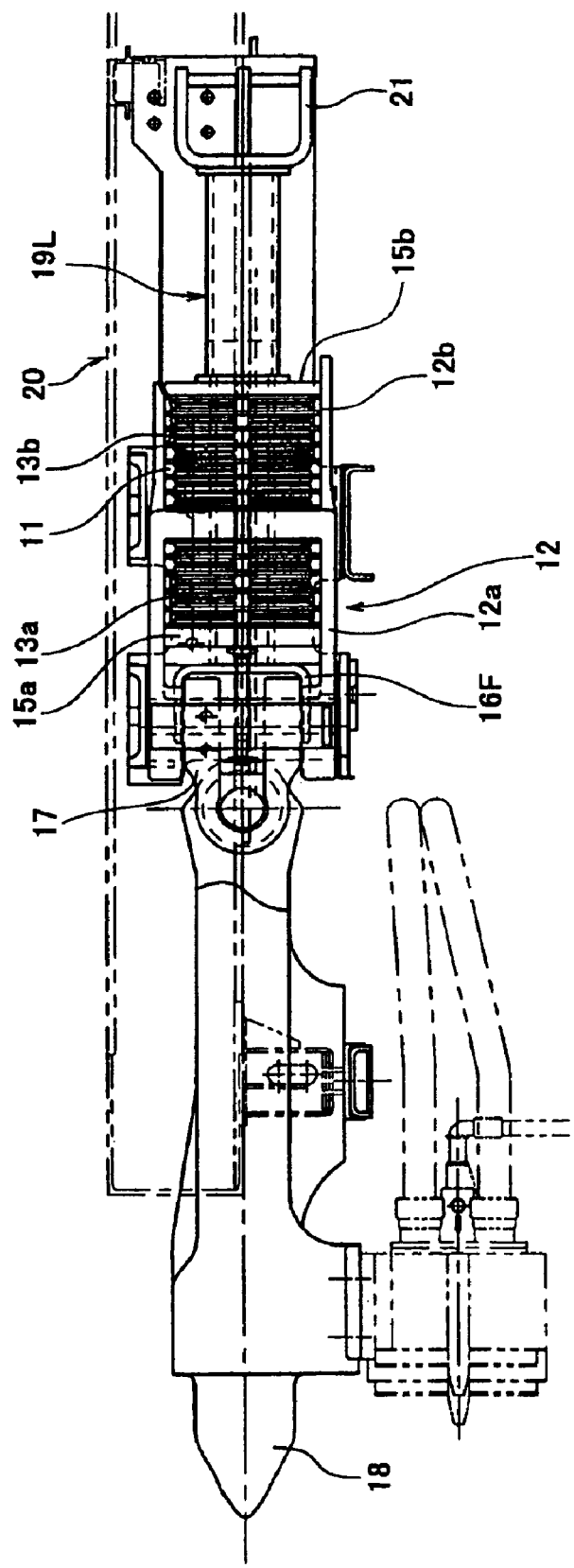
FIG. 13 is a side view showing an example in which a collision energy absorbing structure of a vehicle according to the present invention is applied to a coupler of a railroad vehicle.
Figure 14:
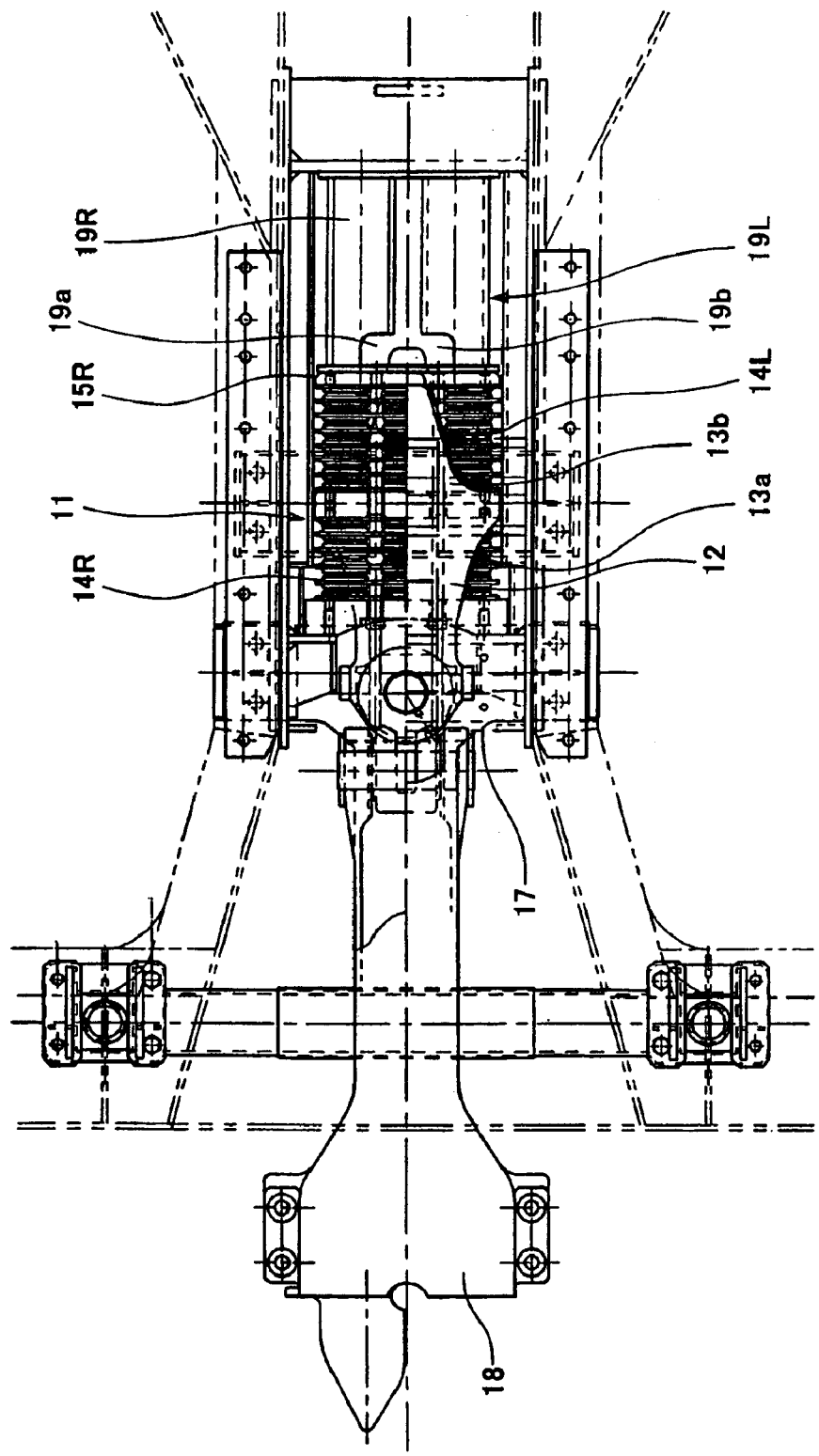
FIG. 14 is a plan view showing the collision energy absorbing structure of the vehicle of FIG. 13.

Referring to FIGS. 13, 14, a rubber damper 11 comprises a draft stop 12 having a front support portion 12a and a rear support portion 12b, front and rear impact absorbing rubbers 13a, 13b respectively provided in the front support portion 12a and the rear support portion 12b of the draft stop 12, a pair of connecting rod members 14R, 14L for respectively connecting and fixing the impact absorbing rubbers 13a, 13b (rubber plates) to the draft stop 12, and flange members 15a, 15b respectively mounted to a front portion of the connecting rod member 14R and a rear portion of the connecting rod member 14L and interposing the impact absorbing rubbers 13a, 13b in the draft stop 12. The front end portions of the connecting rod members 14L, 14R are connected to a front support frame 16F, which is connected to a rear end portion of a coupler 18 with an intermediate member 17 interposed therebetween.

Front end portions of a pair of energy absorbing pipe members 19L, 19R are connected to the rear flange member 15b and rear end portions of the energy absorbing pipe members 19L, 19R are connected to a rear support frame 21 supported by a vehicle body frame 20. The energy absorbing pipe members 19L, 19R are laterally symmetric such that cutout portions 19a, 19b are inwardly opposed for enabling the well-balanced reception of impact force. In other words, the energy absorbing pipe members 19L, 19R are placed to allow the deformation staring portions 19c, 19d respectively provided at front ends of the energy absorbing pipe members 19L, 19R to be located outerly.

With this constitution, by supporting the rubber damper 11 by means of the energy absorbing pipe members 19L, 19R (energy absorbing members), the collision energy remaining partially unabsorbed as the result of deformation by the rubber damper 11 is absorbed by the bellows-like deformation (plastic deformation) of the energy absorbing pipe members 19L, 19R. In a case where a railroad vehicle comprised of a plurality of vehicles collides with another vehicle, the energy absorbing ability of the energy absorbing pipe members 19L, 19R complements the energy absorbing ability of the rubber damper 11 when insufficient, and the event that the vehicle is severely damaged or significant impact acts on passengers can be avoided.

EXAMPLE 2

In this example, the energy absorbing member is applied to a rail guard of a front vehicle of a railroad vehicle.

Figure 15:
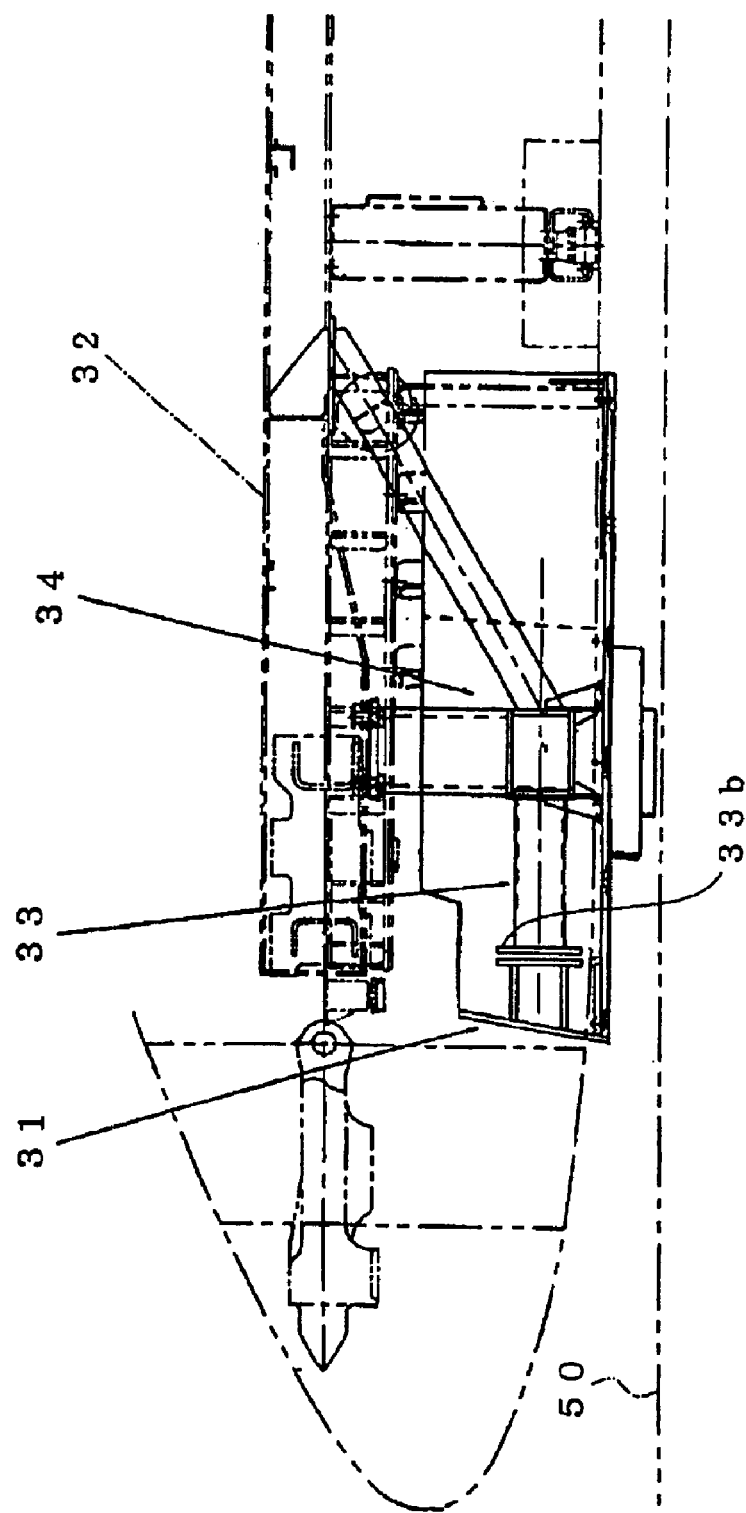
FIG. 15 is a side view showing an example in which the collision energy absorbing structure of the vehicle according to the present invention is applied to a rail guard of a front vehicle of the railroad vehicle.
Figure 16:
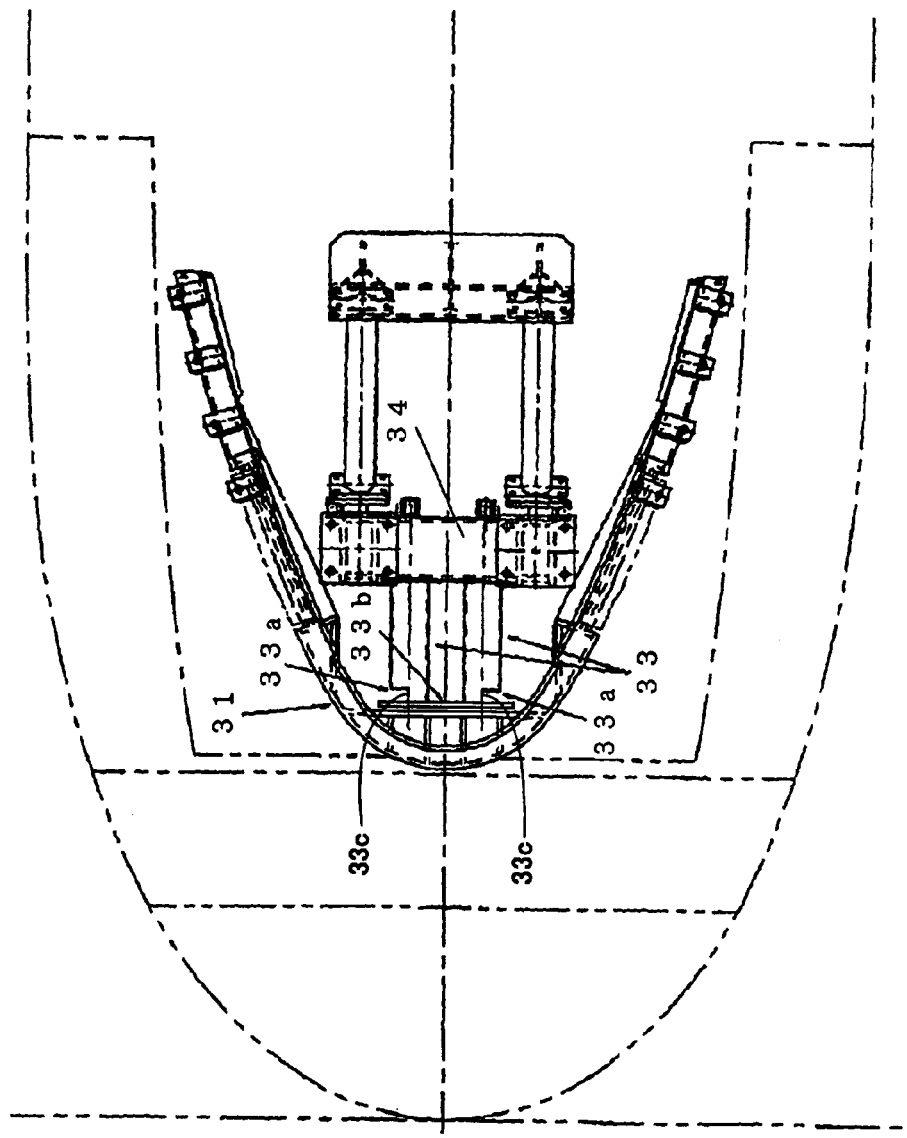
FIG. 16 is a plan view showing a collision energy absorbing structure of the vehicle of FIG. 15.

Referring to FIGS. 15, 16, a rail guard board 31 for eliminating obstacles is bent like horseshoe and mounted and fixed to a vehicle body frame 32. Two energy absorbing pipe members 33 are placed behind the rail guard board 31 so as to be spaced apart therefrom. These energy absorbing pipe members 33 are coupled by means of a coupling member 33b and supported by a support device 34. More specifically, the flat-plate shaped coupling member 33b is connected to tip ends of the respective energy absorbing pipe members 33 and rear ends of the members 33 are fixed to the support device 34. An upper end portion of the support device 34 is fixed to the vehicle body frame 32. In this case, the cutout portions 33a of the respective energy absorbing pipe members 33 are opened outwardly (or inwardly) and laterally symmetric as shown in FIG. 16. In other words, the energy absorbing pipe members 33 are laterally symmetric to allow deformation staring portions 33c provided at front ends of the energy absorbing pipe members 33 to be inwardly located. Reference numeral 50 denotes a rail.

With this constitution, the energy, which remains partially unabsorbed as the result of the deformation of the rail guard board 31, is absorbed by the energy absorbing pipe members 33, thereby relieving the impact on the vehicle body frame 32.

In addition, lightweight is achieved. Specifically, although the energy remaining partially unabsorbed as the result of the deformation of the rail guard board has been conventionally absorbed by the energy absorbing plate composed of flat springs and provided behind the front side of the rail guard board, and the weight is correspondingly increased, the use of the energy absorbing pipe members 33 provides significant lightweight.

EXAMPLE 3

In this example, the impact absorbing member is mounted to the front portion of the front vehicle of the railroad vehicle to absorb the collision energy when front vehicles head-on collide.

Figure 17:
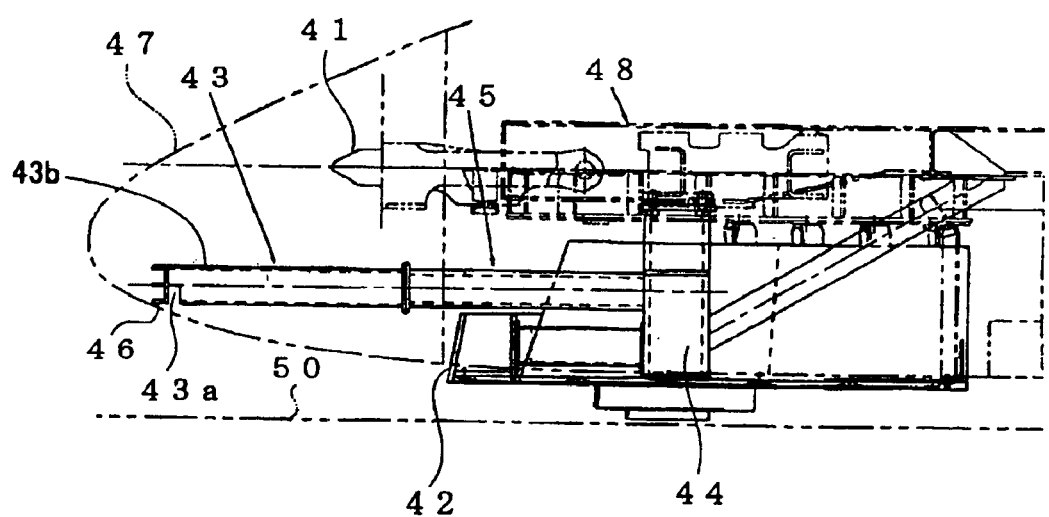
FIG. 17 is a side view showing an example in which the collision energy absorbing structure of the vehicle according to the present invention is mounted to a front portion of a front vehicle of the railroad vehicle.
Figure 18:
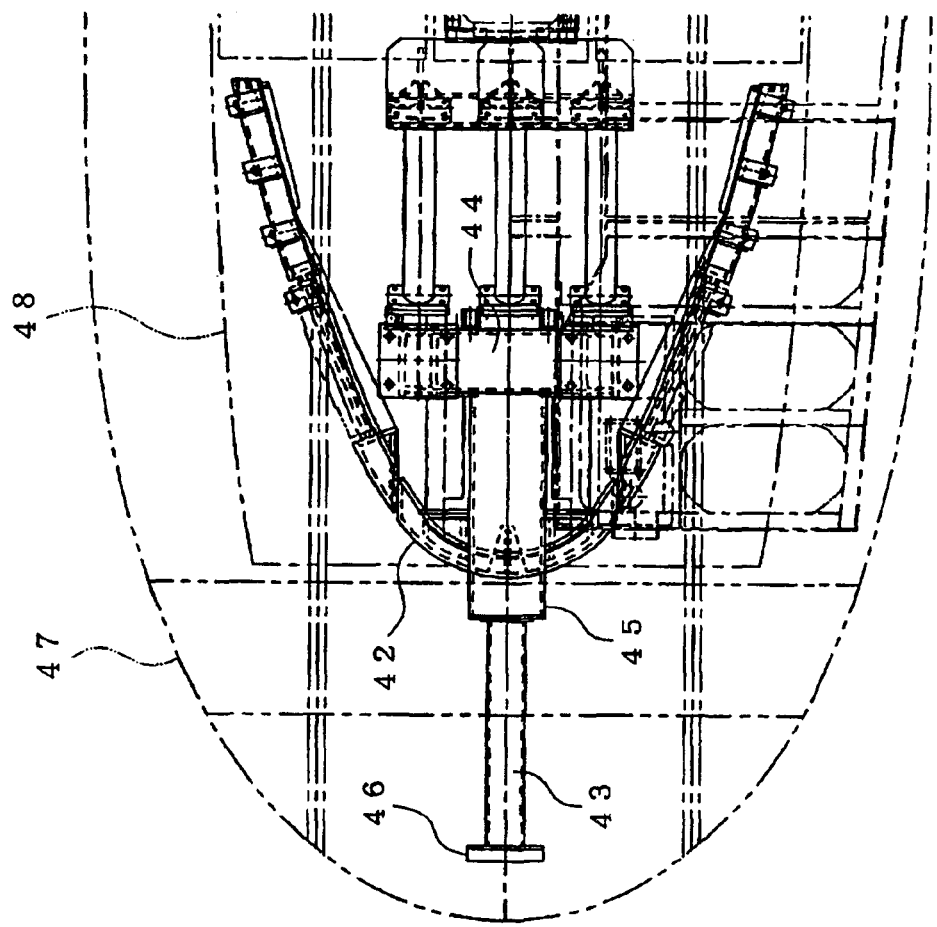
FIG. 18 is a plan view showing the collision energy absorbing structure of the vehicle of FIG. 17.

Referring to FIGS. 17, 18, an energy absorbing pipe member 43 is provided between a coupler 41 located on an upper side and a rail guard plate 42 located on a lower side in the vertical direction. A support pipe member 45 is provided so as to extend in the longitudinal direction of the vehicle from a support device 44 and a rear end portion of the energy absorbing pipe member 43 provided with a tip member 46 is connected to a tip end portion of the support pipe member 45.

The support pipe member 45 extends forwardly of the rail guard board 42 and has a length so as to be located behind the coupler 41. When the vehicle is not used as the front vehicle, the energy absorbing pipe member 43 is removed from the vehicle to allow vehicles to be interconnected by means of the coupler 41. Reference numeral 48 denotes a vehicle body frame. At a portion where the energy absorbing pipe member 43 is connected to the tip member 46, the cutout portion 43a is provided at a lower portion thereof and laterally symmetric. In other words, the energy absorbing pipe member 43 is placed so that a deformation starting portion 43b extended from the tip end of the energy absorbing pipe member 43 is located on the upper side. The tip member 46 is located in a cover 47 on the tip side. Similarly to the examples, 1, 2, it is needless to say that two energy absorbing pipe members symmetrically placed may support a collision member.

With this constitution, when the front vehicles collide with each other, the tip member 46 collides with the tip member 46 of the opposed vehicle, thereby causing the energy absorbing pipe member 43 to be deformed by buckling to absorb the collision energy. Consequently, damage to the other parts can be avoided. Similarly, the opposed vehicle is provided with the energy absorbing pipe member and the tip member.

The present invention is carried out as described above and has the following advantages.

In the collision energy absorbing structure according to the present invention, to deal with the collision in which the force in the longitudinal direction of the vehicle is applied, the cutout portion with the open cross section is formed at the front end portion of the energy absorbing member, and from the front end portion, the deformation starts. In other words, the substantially channel-shaped deformation starting portion is extended from part of the front end of the energy absorbing member. This constitution facilitates the deformation of the front end portion and reduces the initial force peak for generating the bellows-like deformation, and also makes the deformation of the front end portion trigger the following bellows-like deformation and reduces the corresponding force peak. Thereby, the bellows-like deformation occurs naturally and the collision energy can be efficiently absorbed. In other words, since the force peak in the initial stage of collision and the following force peak can be made small and substantially equal and the constant reaction force can be maintained, the impact acting on the passengers can be relieved without a rapid rise in the impact force. In particular, since the cutout portion is provided at the tubular energy absorbing pipe member with rectangular cross section as the energy absorbing member, having equal cross-section dimension and plate thickness and including no inside ribs, the member can be manufactured easily and at a low cost.

In addition, since the plurality of impact absorbing members are vertically or laterally symmetric, the impact force in the traveling direction can be evenly applied to the front end portion of the energy absorbing member so as to cause the bellows-like deformation without falling the energy absorbing member.

Further, since the rubber damper is connected to the vehicle coupler, for relieving the impact generated between the vehicles, the front end portion of the energy absorbing member is connected to the rear end portion of the rubber damper, and the rear end portion of the energy absorbing member is connected to the draft stop mounted to the vehicle body frame, the small collision energy can be absorbed by the rubber damper and the great collision energy can be absorbed by bellows-like deformation of the energy absorbing member.

Still further, by providing the energy absorbing member behind the rail guard board for eliminating obstacles on the rail during traveling and connecting the rear end portion of the energy absorbing member to the vehicle body frame by means of the support device, the excessive collision energy applied to the rail guard board can be absorbed by the bellows-like deformation of the energy absorbing member.

Moreover, by connecting the rear end portion of the energy absorbing member extending forwardly of the coupler and provided with the collision member at the front end to the front end portion of the support device (support pipe member) mounted to the vehicle body frame, provided behind the coupler, and extending forwardly of the rail guard board, the collision energy can be absorbed by the bellows-like deformation of the energy absorbing member and the impact acting on the passengers can be relieved.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meters and bounds of the claims, or equivalence of such meters and bounds thereof are therefore intended to be embodied by the claims.

What is claimed is:

1. A collision energy absorbing structure of a vehicle comprising:

a tubular energy absorbing member provided in the longitudinal direction of the vehicle and configured to have four flat plate portions so as to form rectangular cross section, the tubular energy absorbing member being formed by a tubular pipe member having an equally-sized rectangular cross section and an equal plate thickness and including no inside ribs, and the tubular energy absorbing member being adapted to receive a collision force in the longitudinal direction of the vehicle and deformed like bellows by buckling, so as to absorb a collision energy;

a deformation starting portion provided by forming a cutout portion in one of right and left sides or one of upper and lower sides of a front end portion of the energy absorbing member; and wherein the cutout portion is formed in parts of three of the flat plate portions and comprised of one of the four flat plate portions and adjacent flat plate portions located on both sides thereof.

* * * * *